United States Patent
Maurer et al.

(10) Patent No.: US 12,229,972 B2
(45) Date of Patent: Feb. 18, 2025

(54) UNSUPERVISED TRAINING OF OPTICAL FLOW ESTIMATION NEURAL NETWORKS

(71) Applicant: Waymo LLC, Mountain View, CA (US)

(72) Inventors: Daniel Rudolf Maurer, Mountain View, CA (US); Austin Charles Stone, San Francisco, CA (US); Alper Ayvaci, Santa Clara, CA (US); Anelia Angelova, Sunnyvale, CA (US); Rico Jonschkowski, Berlin (DE)

(73) Assignee: Waymo LLC, Mountain View, CA (US)

( * ) Notice: Subject to any disclaimer, the term of this patent is extended or adjusted under 35 U.S.C. 154(b) by 495 days.

(21) Appl. No.: 17/721,288

(22) Filed: Apr. 14, 2022

(65) Prior Publication Data
US 2022/0335624 A1    Oct. 20, 2022

Related U.S. Application Data

(60) Provisional application No. 63/175,498, filed on Apr. 15, 2021.

(51) Int. Cl.
*G06T 7/246* (2017.01)
*G06N 3/08* (2023.01)
(Continued)

(52) U.S. Cl.
CPC .............. *G06T 7/248* (2017.01); *G06N 3/08* (2013.01); *G06T 3/18* (2024.01); *G06T 5/77* (2024.01); *G06T 7/174* (2017.01); *G06T 2207/20081* (2013.01); *G06T 2207/20084* (2013.01); *G06T 2207/20132* (2013.01)

(58) Field of Classification Search
CPC .. G06T 7/248; G06T 3/18; G06T 5/77; G06T 7/174; G06T 2207/20081; G06T 2207/20084; G06T 2207/20132; G06T 2207/30252; G06T 7/20; G06T 7/269;
(Continued)

(56) References Cited

U.S. PATENT DOCUMENTS 10,289,912 B1 *  5/2019  Vijayanarasimhan ....................... G06F 18/2431
2011/0286635 A1 * 11/2011  Nishigaki ............... G06T 7/248
                                                                           382/107
(Continued)

OTHER PUBLICATIONS

Brox et al., "High accuracy optical flow estimation based on a theory for warping," European Conference on Computer Vision, 2004, pp. 25-36.
(Continued)

*Primary Examiner* — Solomon G Bezuayehu
(74) *Attorney, Agent, or Firm* — Fish & Richardson P.C.

(57) ABSTRACT

Methods, systems, and apparatus, including computer programs encoded on computer storage media, for training a neural network to predict optical flow. One of the methods includes obtaining a batch of one or more training image pairs; for each of the pairs: processing the first training image and the second training image using the neural network to generate a final optical flow estimate; generating a cropped final optical flow estimate from the final optical flow estimate; and training the neural network using the cropped optical flow estimate.

20 Claims, 6 Drawing Sheets

(51) Int. Cl.
    *G06T 3/18*    (2024.01)
    *G06T 5/77*    (2024.01)
    *G06T 7/174*   (2017.01)
(58) Field of Classification Search
    CPC . G06T 7/246; G06T 2207/10016; G06N 3/08;
                                G06N 3/045; G06N 3/088
    See application file for complete search history.

(56) References Cited

U.S. PATENT DOCUMENTS

| | | | |
|---|---|---|---|
| 2017/0186176 A1* | 6/2017 | Paluri | G06V 10/764 |
| 2019/0392591 A1* | 12/2019 | Lee | G01V 8/10 |
| 2020/0160065 A1* | 5/2020 | Weinzaepfel | G06N 3/045 |
| 2020/0210708 A1* | 7/2020 | Jia | G06F 18/214 |
| 2020/0357099 A1* | 11/2020 | Long | G06T 5/77 |
| 2021/0035268 A1* | 2/2021 | Xu | G06T 5/00 |
| 2021/0097715 A1* | 4/2021 | Li | G06T 7/73 |
| 2021/0183079 A1* | 6/2021 | Cook | H04N 13/128 |
| 2021/0232933 A1* | 7/2021 | Gu | G06N 3/10 |
| 2022/0129667 A1* | 4/2022 | Afrasiabi | G06V 10/80 |
| 2022/0262012 A1* | 8/2022 | Li | G06N 3/08 |
| 2022/0319054 A1* | 10/2022 | Abdo | G06N 3/0464 |

OTHER PUBLICATIONS

Butler et al., "A naturalistic open source movie for optical flow evaluation," European Conference on Computer Vision, 2012, pp. 611-625.
Chen et al., "Full flow: Optical flow estimation by global optimization over regular grids," Proceedings of the IEEE Conference on Computer Vision and Pattern Recognition, 2016, pp. 4706-4714.
Dosovitskiy et al., "Flownet: Learning optical flow with convolutional networks," Proceedings of the IEEE International Conference on Computer Vision, 2015, pp. 2758-2766.
Extended European Search Report in European Appln. No. 22168578.7, dated Sep. 22, 2022, 10 pages.
Horn et al., "Determining optical flow," Artificial Intelligence, Aug. 1981, 17(1-3):185-203.
Ilg et al., "Flownet 2.0: Evolution of optical flow estimation with deep networks," Proceedings of the IEEE Conference on Computer Vision and Pattern Recognition, 2017, pp. 2462-2470.
Janai et al., "Unsupervised learning of multi-frame optical flow with occlusions," Proceedings of the European Conference on Computer Vision, 2018, pp. 690-706.
Jonschkowski et al., "What matters in unsupervised optical flow," European Conference on Computer Vision, Aug. 2020, pp. 557-572.
Kingma et al., "Adam: A method for stochastic optimization," CoRR, Dec. 2014, https://arxiv.org/abs/1412.6980, 15 pages.
Liu et al., "A survey on deep learning methods for scene flow estimation," Pattern Recognition, May 2020, 106, 106:107378.
Liu et al., "DDFlow: Learning optical flow with unlabeled data distillation," AAAI Techincal Track: Vision, Jul. 17, 2019, 33(1):IAAI-19-EAAI-20.
Liu et al., "Selflow:Self-supervised learning of optical flow," Proceedings of the IEEE/CVF Conference on Computer Vision and Pattern Recognition, 2019, pp. 4571-4580.
Lucas et al., "An iterative image registration technique with an application to stereo vision," Proceedings DARPA Image Understanding Workshop, Apr. 1981, pp. 121-130.
Maurer et al., "Proflow: Learning to predict optical flow," BMVC, 2018, 16 pages.
Mayer, et al., "A large dataset to train convolutional networks for disparity, optical flow, and scene flow estimation," Proceedings of the IEEE Conference on Computer Vision and Pattern Recognition (CVPR), 2016, pp. 4040-4048.
Meister et al., "Unflow: Unsupervised learning of optical flow with a bidirectional census loss," Proceedings of the AAAI Conference on Artificial Intelligence, Apr. 27, 2018, 32(1):7251-7259.
Menze et al., "Joint 3D estimation of vehicles and scene flow," ISPRS Workshop on Image Sequence Analysis, Sep. 28, 2015, II-3/W5:427-434.
Ranjan et al., "Competitive collaboration: Joint unsupervised learning of depth, camera motion, optical flow and motion segmentation," Proceedings of the IEEE/CVF Conference on Computer Vision and Pattern Recognition (CVPR), 2019, pp. 12240-12249.
Ranjan et al., "Optical flow estimation using a spatial pyramid network," Proceedings of the IEEE Conference on Computer Vision and Pattern Recognition, 2017, pp. 4161-4170.
Ren et al., "Unsupervised deep learning for optical flow estimation," Proceedings of the AAAI Conference on Artificial Intelligence, Feb. 12, 2017, pp. 1495-1501.
Steinbrucker et al., "Large displacement optical flow computation without warping," 2009 IEEE 12th International Conference on Computer Vision, Sep. 29, 2009, 6 pages.
Stone et al., "SMURF: Self-Teaching Multi-Frame Unsupervised RAFT with Full-Image Warping," 2021 IEEE/CVF Conference on Computer Vison and Pattern Recognition (CVPR), Jun. 2021, pp. 3886-3895.
Sun et al., "Secrets of optical flow estimation and their principles," 2010 IEEE Computer Society Conference on Computer Vision and Pattern Recognition, Jun. 13-18, 2010, 8 pages.
Sun et al., "PWC-Net: CNNs for optical flow using pyramid, warping, and cost volume," Proceedings of the IEEE Conference on Computer Vision and Pattern Recognition, 2018, pp. 8934-8943.
Teed et al., "Raft: Recurrent all pairs field transforms for optical flow," ECCV 2020: Computer Vision—ECCV 2020 , Nov. 3, 2020, pp. 402-419.
Tomasi et al., "Bilateral filtering for gray and color images," Sixth International Conference on Computer Vision (IEEE Cat. No. 98CH36271), Aug. 6, 2002, 8 pages.
Ulyanov et al., "Instance normalization: The missing ingredient for fast stylization," CoRR, Jul. 27, 2016, arxiv.org/abs/1607.08022, 6 pages.
Vedula et al., "Three-dimensional scene flow," Proceedings of the Seventh IEEE International Conference on Computer Vision, Sep. 20-27, 1999, 8 pages.
Wang et al., "Occlusion aware unsupervised learning of optical flow," Proceedings of the IEEE Conference on Computer Vision and Pattern Recognition (CVPR), 2018, pp. 4884-4893.
Wang et al., "Unos: Unified unsupervised optical-flow and stereo-depth estimation by watching videos," Proceedings of the IEEE/CVF Conference on Computer Vision and Pattern Recognition, 2019, pp. 8071-8081.
Xu et al., "Accurate optical flow via direct cost vol. processing," Proceedings of the IEEE Conference on Computer Vision and Pattern Recognition (CVPR), 2017, pp. 1289-1297.
Yang et al., "Volumetric correspondence networks for optical flow," Advances in Neural Information Processing Systems 32 (NeurIPS 2019), 2019, 12 pages.
Yin et al., "Geonet: Unsupervised learning of dense depth, optical flow and camera pose," Proceedings of the IEEE Conference on Computer Vision and Pattern Recognition (CVPR), 2018, pp. 1983-1992.
Yu et al., "Back to basics: Unsupervised learning of optical flow via brightness constancy and motion smoothness," European Conference on Computer Vision, Nov. 24, 2016, 4 pages.
Zabih et al., "Non-parametric local transforms for computing visual correspondence," European Conference on Computer Vision, May 1994, pp. 151-158.
Zhong et al., "Unsupervised deep epipolar flow for stationary or dynamic scenes," Proceedings of the IEEE/CVF Conference on Computer Vision and Pattern Recognition (CVPR), 2019, pp. 12095-12104.
Zou et al., "DF-Net: Unsupervised joint learning of depth and flow using cross-task consistency," Proceedings of the European Conference on Computer Vision (ECCV), 2018, pp. 36-53.

* cited by examiner

UNSUPERVISED TRAINING OF OPTICAL FLOW ESTIMATION NEURAL NETWORKS

CROSS-REFERENCE TO RELATED APPLICATION

This application claims the benefit of U.S. Provisional Application No. 63/175,498, filed on Apr. 15, 2021. The disclosure of the prior application is considered part of and is incorporated by reference in the disclosure of this application.

BACKGROUND

This specification relates to processing images using neural networks to predict optical flow. Predicting optical flow, i.e., estimating the motion of pixels between one image and another, can assist in motion planning, e.g., by an autonomous vehicle. Autonomous vehicles include self-driving cars, boats, and aircraft. Autonomous vehicles use a variety of on-board sensors and computer systems to detect nearby objects and use such detections to make control and navigation decisions.

BRIEF DESCRIPTION OF THE DRAWINGS

Like reference numbers and designations in the various drawings indicate like elements.

DETAILED DESCRIPTION

Figure 1:
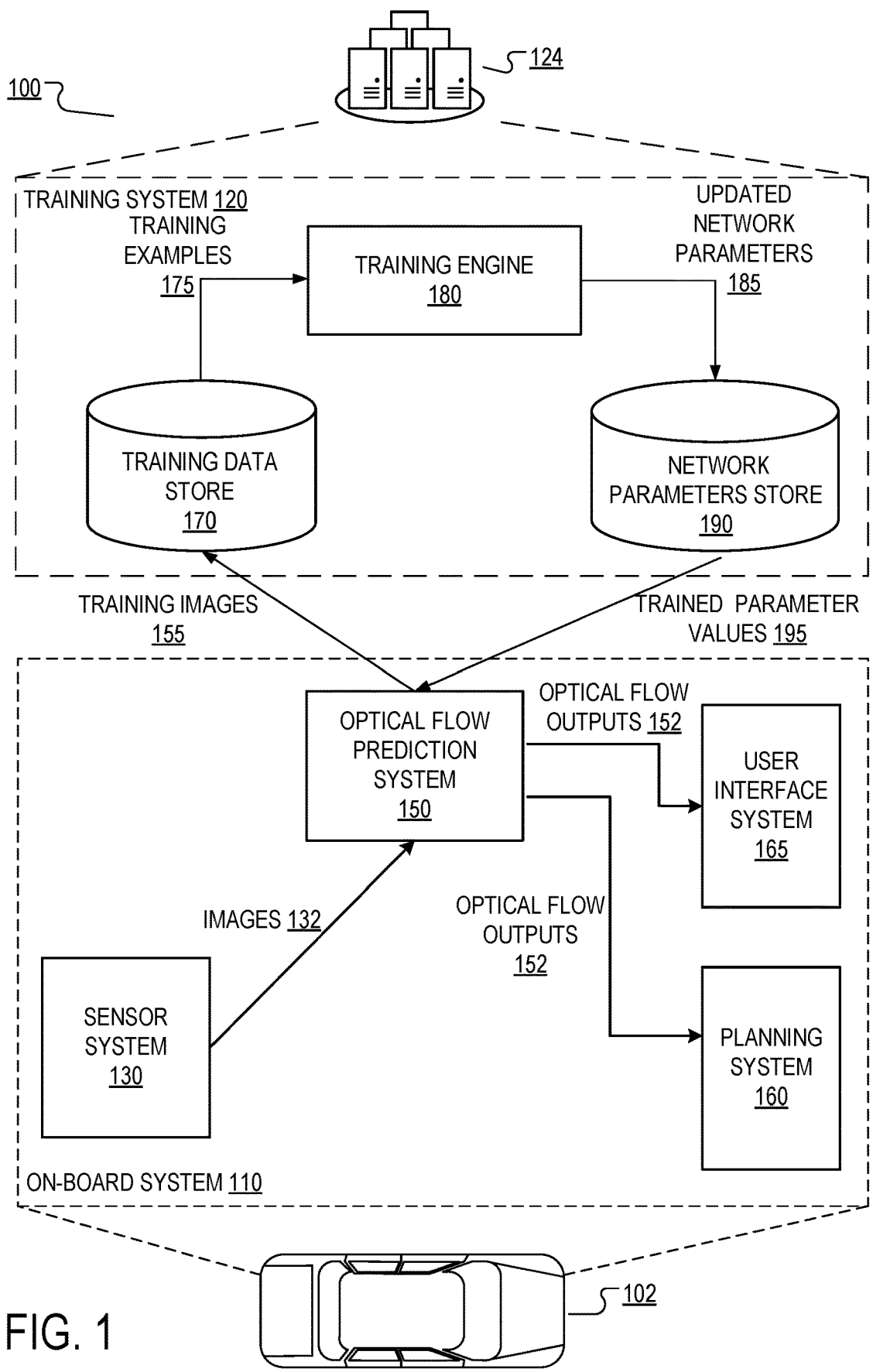
FIG. 1 is a diagram of an example system.

This specification describes a system implemented as computer programs on one or more computers in one or more locations that trains an optical flow estimation neural network.

An optical flow estimation neural network receives as input two images taken at different times and generates as output an estimate of an optical flow between the two images. The optical flow estimate represents an estimate of the motion of pixels between one image and another. For example, the optical flow estimate can include, for each pixel in one of the images, a predicted offset. The predicted offset for a given pixel represents the predicted location of the given pixel in the other image.

Accurately predicting the optical flow between images, i.e., accurately predicting the motion of pixels between the two images, can provide an important and useful signal to an autonomous vehicle or another agent, e.g., a robot, navigating through an environment. For example, accurately predicting the optical flow can enable the autonomous vehicle or other agent to identify potential obstacles, distinguish between parts of the scene that are static and dynamic, estimate the trajectories of objects in the scene, and assist in a variety of downstream tasks, e.g., object detection, object tracking, and image segmentation, that are useful to effective operation.

Some existing techniques attempt to train optical flow estimation neural networks through supervised learning. In particular, these techniques require a set of "supervised" or "labeled" training data that includes multiple labeled training examples. Each labeled training example includes an image pair and, for each pixel in one of the images in the image pair, a label that identifies the ground truth motion of the pixel between the two images in the image pair.

However, this supervised training data is difficult to obtain or generate for real-world images. For example, even generating a single training example requires a user to manually label the motion of each pixel in one of the images in the image pair that is in the training example. Because real-world images have large numbers of pixels and because deep neural networks require a very large number of training examples to be trained to make accurate predictions, generating a training data set of real-world images becomes extremely time-consuming and, in many cases, impossible. Thus, optical flow estimation neural networks suitable for accurately predicting optical flow between real-world images have not been able to be effectively trained through supervised learning.

To mitigate this issue, this specification describes techniques for training a scene flow estimation neural network through unsupervised, rather than supervised, learning. In particular, this specification describes techniques for training the neural network on image pairs that are not associated with any labels. Thus, large data sets of easily obtained real-world images can be used to train the neural network without requiring manual labeling. Moreover, because of the unsupervised loss function that is used to train the neural network, the trained neural network can estimate optical flow with high accuracy in a variety of real-world scenarios that can be encountered by an autonomous vehicle or other agent navigating through a real-world environment. Accordingly, once the trained neural network is deployed on-board an autonomous vehicle or another agent, the autonomous vehicle or other agent will be able to more effectively navigate through the environment.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include one or more camera sensors that detect reflections of visible light and optionally one or more other sensors, e.g., lidar sensors that generate point clouds, radar sensors that detect reflections of radio waves, and so on.

As the vehicle 102 navigates through the environment, various sensors capture measurements of the environment. For example, a camera sensor can repeatedly capture images 132 during the navigation.

Once the sensor subsystems 130 generate the images 132, the sensor subsystems 130 can send the images 132 to an optical flow prediction system 150, also on-board the vehicle 102.

At any given time, the optical flow prediction system 150 processes a pair of images 132 to generate an optical flow output 152 for one of the images in the pair.

More specifically, the optical flow prediction system 150 can process the most recent image that was received by the optical flow prediction system 150, i.e., an image generated at a most recent time point, and an earlier image, i.e., an image that was generated at an earlier time point than the most recent time point, to generate an optical flow output 152 that includes a respective flow prediction for each of a plurality of points in one of the images.

In some implementations, the system 150 is configured to perform "forward" flow prediction. In these implementations, the optical flow output 152 includes, for each of a plurality of pixels in the earlier image, a respective flow prediction that represents the predicted motion of the pixel from the earlier image to the most recent image. For example, the prediction can be a predicted offset that represents the position of a corresponding pixel in the most recent image, i.e., the position of the pixel in the most recent image that depicts the same portion of the scene as the given pixel in the earlier image. That is, given a pixel (i,j) in the earlier image, where i is the x coordinate of the pixel and j is they coordinate of the pixel, the system 150 can predict an offset (a,b) so that the position of the corresponding pixel in the most recent image is (i+a, j+b).

In some other implementations, the system 150 is configured to perform "backward" flow prediction. In these implementations, the optical flow output 152 includes, for each of a plurality of pixels in the most recent image, a respective flow prediction that represents the predicted motion of the pixel from the most recent image to the earlier image. For example, the prediction for a given pixel in the most recent image can be a predicted offset that represents the position of a corresponding pixel in the earlier image, i.e., the position of the pixel in the earlier image that depicts the same portion of the scene as the given pixel in the most recent image. That is, given a pixel (i,j) in the most recent image, the system 150 can predict an offset (a,b) so that the position of the corresponding pixel in the earlier image is (i+a, j+b).

To generate the optical flow output 152, the optical flow prediction system 150 processes the earlier image and the most recent image using an optical flow estimation neural network in accordance with trained parameter values 195 of the optical flow estimation neural network. That is, the optical flow estimation neural network is configured to receive as input the two images and to generate as output the optical flow output 152. The optical flow output 152 is also referred to as an optical flow estimate or a "final" optical flow estimate.

The optical flow estimation neural network can generally have any appropriate architecture that allows the neural network to map two images to a respective flow prediction for each of multiple points in one of the input images.

As a particular example, the optical flow estimation neural network can generate the optical flow estimate by first initializing the optical flow estimate, e.g., to a default, fixed estimate or to a learned estimate, and then, at each of a plurality of update iterations, updating the optical flow estimate using features of the first image and the second image. That is, the neural network can refine the optical flow estimate at each of the update iterations and then use the optical flow estimate after the final iteration as the final optical flow iterations. In some implementations, the number of update iterations that are performed can be fixed for each pair of images. In some other implementations, the neural network performs update iterations for a given pair of images until a compute or latency budget for generating the optical flow estimate is exhausted. An example architecture of such a neural network, i.e., that updates an optical flow estimate at multiple update iterations, is described in more detail in Zachary Teed and Jia Deng. Raft: Recurrent all pairs field transforms for optical flow, In ECCV, 2020, the entire contents of which are hereby incorporated by reference in their entirety.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the optical flow outputs 152 generated by the optical flow prediction system 150 to one or more other on-board systems of the vehicle 102, e.g., the planning system 160 and/or a user interface system 165.

When the planning system 160 receives the optical flow outputs 152, the planning system 160 can use the optical flow outputs 152 to generate planning decisions that plan a future trajectory of the vehicle, i.e., to generate a new planned vehicle path. For example, the optical flow outputs 152 may contain a prediction that one or more points on a given object in the environment have a velocity that will cause the given object to intersect with a currently planned path for the vehicle 102, potentially causing a collision. In this example, the planning system 160 can generate a new planned vehicle path that avoids the potential collision and cause the vehicle 102 to follow the new planned path, e.g., by autonomously controlling the steering of the vehicle. As another example, the planning system 160 can use the optical flow outputs 152 to perform one or more downstream tasks, e.g., object tracking, trajectory prediction, and so on, and then use the outputs of these downstream tasks to generate or update the planned vehicle path.

When the user interface system 165 receives the optical flow outputs 152, the user interface system 165 can use the optical flow outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the optical flow outputs 152 may contain a prediction that indicates that a particular object will interest the current path of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

The optical flow prediction system 150 can obtain the trained parameter values 195, i.e., the trained parameter values of the optical flow estimation neural network used by the optical flow prediction system 150, from a network parameters store 190 in the training system 120.

The training system 120 is typically hosted within a data center 124, which can be a distributed computing system having hundreds or thousands of computers in one or more locations.

The training system 120 receives images from vehicles operating in the real world and/or from other sources, e.g., synthetic training examples generated in simulation or training examples generated by sensors on other agents, e.g., robots or other moving agents. For example, the training system 120 can receive training images 155 from the vehicle 102 and one or more other agents that are in communication with the training system 120.

The training images 155 can be processed by the training system 120 to generate a new training example 175. In particular, each new training example 175 includes two images: (i) a current image generated at a current time point and representing an observed scene in an environment the current time point and (ii) an earlier image generated at an earlier time point and representing the observed scene in the environment at the earlier time point.

In some implementations, as will be described in more detail below, the training system 120 also generates additional training examples that each include a sequence of three images: (i) a current image generated at a current time point and representing an observed scene in an environment the current time point, (ii) a preceding training image that precedes the current training image in the sequence and represents the observed scene at a preceding time point, and (iii) a following training image that follows the current training image in the sequence and represents the observed scene at a preceding time point.

The training data store 170 provides training examples 175 to a training engine 180, also hosted in the training system 120.

The training engine 180 uses the training examples 175 to update the parameters of the optical flow estimation neural network, and provides the updated network parameters 185 to the network parameters store 190. Advantageously, the training engine 180 trains the optical flow estimation neural network through unsupervised learning, i.e., using a training technique that does not require any of the training examples 175 to be associated with user-generated optical flow labels.

That is, the training engine 180 trains the optical flow estimation neural network on the training examples 175 to minimize one or more unsupervised loss functions. An "unsupervised" loss function is one that does not depend on any manually-generated labels for any of the inputs to the neural network. Training the neural network is described in more detail below with reference to FIGS. 2-6.

Once the parameter values of the optical flow estimation neural network have been fully trained, the training system 120 can send the trained parameter values 195 to the optical flow prediction system 150, e.g., through a wired or wireless connection.

While this specification describes that optical flow outputs are generated on-board an autonomous vehicle, more generally, the described techniques can be implemented on any system of one or more computers that receives images of scenes in an environment. That is, once the training system 120 has trained the optical flow estimation neural network, the trained neural network can be used by any system of one or more computers.

As one example, the optical flow predictions can be made on-board a different type of agent that has a camera sensor and that interacts with objects as it navigates through an environment. For example, the optical flow predictions can be made by one or more computers embedded within a robot or other agent.

As another example, the optical flow predictions can be made by one or more computers that are remote from the agent and that receive images captured by the camera sensor of the agent. In some of these examples, the one or more computers can use the location predictions to generate control decisions for controlling the agent and then provide the control decisions to the agent for execution by the agent.

As another example, the optical flow predictions may be made in a computer simulation of a real-world environment being navigated through by a simulated autonomous vehicle and the target agents. Generating these predictions in simulation may assist in controlling the simulated vehicle and in testing the realism of certain situations encountered in the simulation. More generally, generating these predictions in simulation can be part of testing the control software of a real-world autonomous vehicle before the software is deployed on-board the autonomous vehicle, of training one or more machine learning models that will later be deployed on-board the autonomous vehicle, or both.

Figure 2:
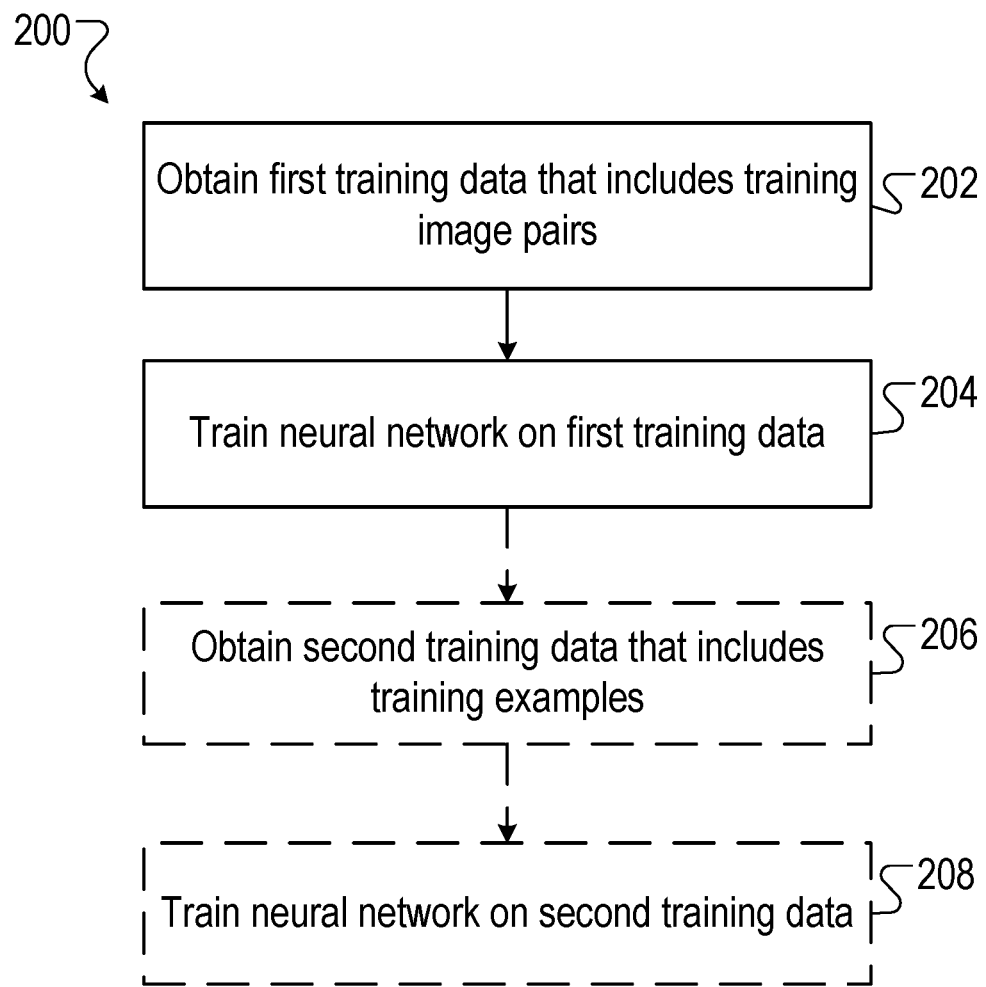
FIG. 2 is a flow diagram of an example process for training an optical flow estimation neural network.

FIG. 2 is a flow diagram of an example process 200 for training an optical flow estimation network. For convenience, the process 200 will be described as being performed by a system of one or more computers located in one or more locations. For example, a training system, e.g., the training system 120 of FIG. 1, appropriately programmed in accordance with this specification, can perform the process 200.

The system obtains first training data that includes multiple training image pairs (step 202). Each training image pair includes a respective first training image and a respective second training image, i.e., one image of a scene taken at a first time point and another image of the same scene taken at a second, different time point.

The system trains the optical flow estimation neural network on the first training data through unsupervised learning (step 204).

In particular, the system performs multiple training steps in order to train the neural network.

At each training step, the system obtains a batch of one or more training image pairs. For example, the system can sample the batch at random from the first training data or can select the batch from the first training data according to a predetermined order. The system then updates the network parameters of the optical flow estimation neural network, i.e., the weights and, optionally, the biases, of the layers of the optical flow estimation neural network, by computing gradients of a first unsupervised loss function.

Training the neural network on the first training data will be described in more detail below with reference to FIGS. 3-5.

The system can continue performing training steps until a termination criterion has been satisfied, e.g., a threshold number of training steps have been performed, a threshold amount of time has elapsed, or the network parameters have converged.

Optionally, the system can also perform a second training stage after the system has trained the neural network on the first training data.

To perform the second training stage, the system obtains second training data that includes multiple second training examples (step 206). Each second training example includes three images: (i) a current image generated at a current time point and representing an observed scene in an environment the current time point, (ii) a preceding training image that precedes the current training image in the sequence and represents the observed scene at a preceding time point, and (iii) a following training image that follows the current training image in the sequence and represents the observed scene at a preceding time point.

The system then trains the neural network on the second training data through unsupervised learning (step 208) starting from the network parameters that were determined by training the neural network in step 204.

In particular, the system performs multiple training steps in order to train the neural network on the second training data.

At each training step, the system obtains a batch of one or more second training examples. For example, the system can sample the batch at random from the second training data or can select the batch from the second training data according to a predetermined order. The system then computes a gradient of a second unsupervised loss function with respect to the network parameters, e.g., through backpropagation, and updates the network parameters using the gradient, i.e., by applying an appropriate machine learning update rule to the gradient and the current values of the network parameters, e.g., the stochastic gradient descent update rule, the Adam optimizer update rule, the rmsProp update rule, or the AdaGrad optimizer update rule.

Computing a gradient of the second unsupervised loss function is described below with reference to FIG. 6.

The system can continue performing training steps until a termination criterion has been satisfied, e.g., a threshold number of training steps have been performed, a threshold amount of time has elapsed, or the network parameters have converged.

After training, i.e., after step 204 or step 208 have been performed, the system can deploy the trained optical flow estimation neural network for predicting optical flow as described above.

Figure 3:
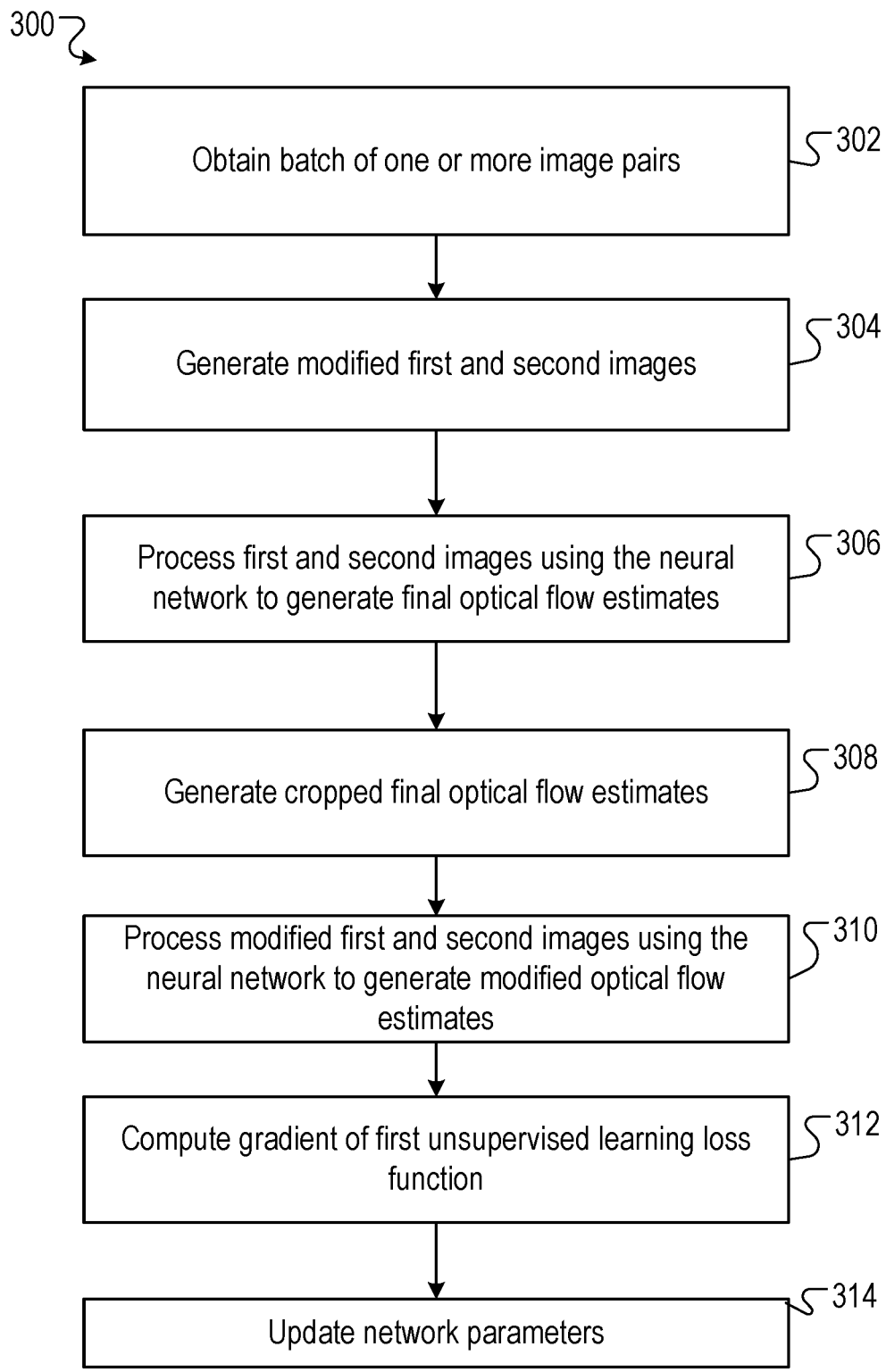
FIG. 3 is a flow diagram of an example process for performing a training step.

FIG. 3 is a flow diagram of an example process 300 for performing a training step. For convenience, the process 300 will be described as being performed by a system of one or more computers located in one or more locations. For example, a training system, e.g., the training system 120 of FIG. 1, appropriately programmed in accordance with this specification, can perform the process 300.

The system obtains a batch of one or more training image pairs (step 302) that each include a respective first image and a respective second image.

For each of the one or more training image pairs, the system generates a modified first training image and a modified second training image (step 304). In particular, the system crops and, optionally, also applies one or more augmentations to the first image and the second image to generate the modified images. For example, system can randomly select a region that has a predetermined fixed size, and then crop both the first and second image to include only the random region. Thus, the modified images have a smaller resolution than the first and second training images.

Optionally, the system can apply one or more augmentations to the first image and the second image prior to performing the cropping. When used, the system can apply one or more of a variety of image augmentation techniques to a given image. For example, the system can apply one more of: augmentations that randomly vary one or more of hue, brightness, or saturation of an image, augmentations that stretch an image, augmentations that scale an image, augmentations that randomly crop an image, augmentations that randomly flip an image left/right, augmentations that randomly flip an image up/down, or a random eraser augmentation that removes random parts of each image.

For each of the one or more training image pairs, the system processes the first training image and the second training image, i.e., the uncropped (and un-augmented) full-size images, using the neural network to generate a final optical flow estimate from the first training image to the second training image (step 306). When the neural network performs multiple update iterations, the final optical flow estimate is the final estimate after all of the update iterations have been performed. That is, as described above, the neural network updates the optical flow estimate at each of the update iterations and, therefore, the respective optical flow estimate for a given iteration is the optical flow estimate after being updated at the given iteration. The system can then use the optical flow estimate after the final iteration as the final optical flow estimate.

For each of the one or more training image pairs, the system generates a cropped final optical flow estimate from the first training image to the second training image, i.e., by cropping the final optical flow estimate from the first training image to the second training image to include only the predictions for the pixels in the randomly selected region of the first training image (step 308).

Generally, the system then proceeds to train the neural network by, for each training image pair, using the cropped final optical flow estimate as a target for the neural network. That is, the system uses the cropped final optical flow estimate as the target output that should be generated by the neural network and that is used to update the network parameters of the neural network.

More specifically, for each of the one or more training image pairs, the system processes the modified first training image and the modified second training image using the neural network to generate one or more modified optical flow estimates (step 310). When the neural network performs multiple update iterations, the system generates a respective modified optical flow estimate for each of the plurality of update iterations. That is, as described above, the neural network updates the modified optical flow estimate at each of the update iterations and, therefore, the respective modified optical flow estimate for a given iteration is the modified optical flow estimate after being updated at the given iteration.

The system computes, e.g., through backpropagation, a gradient with respect to the network parameters of the first unsupervised loss function (step 312).

Generally, the first unsupervised loss function includes one or more loss terms. When the loss function includes multiple loss terms, the loss function can be a weighted sum of the multiple loss terms.

More specifically, the loss function includes a first term that is based on, for each training image pair, the respective modified optical flow estimates and the cropped final optical flow estimate, and optionally one or more other loss terms.

The first loss term is described in more detail below with reference to FIG. 4.

Optionally, the loss function can also include a second loss term that encourages photometric consistency in the optical flow estimates.

An example of a second loss term that can be included in the loss function is described in more detail below with reference to FIG. 5.

Optionally, the loss function can also include a third loss term that encourages the optical flow estimates for each of the image pairs to be smooth.

More specifically, the third term measures, for each training image pair and for each of the plurality of update iterations, an edge-aware smoothness of the respective modified optical flow estimate for the training image pair and for the update iteration.

As a particular example, the third term can be a k-th order edge-aware smoothness term that, for each update iteration, is defined as:

$$\frac{1}{HW}\sum\left(\exp\left(-\frac{\lambda}{3}\sum_c\left|\frac{\partial I_{1c}}{\partial x}\right|\right)\odot\left|\frac{\partial^k V_1}{\partial x^k}\right|+\exp\left(-\frac{\lambda}{3}\sum_c\left|\frac{\partial I_{1c}}{\partial y}\right|\right)\odot\left|\frac{\partial^k V_1}{\partial y^k}\right|\right),$$

where $$\frac{1}{HW}\sum$$

is the mean over all pixels lot the update iteration of the expression that follows the Σ sign, ⊙ represents element-wise multiplication, x is the x axis of the first image $I_1$ and the second image $I_2$, y is they axis of the first image $I_1$ and the second image $I_2$, $V_1$ is the modified optical flow estimate for the corresponding update iteration, k and λ are constants, and c represents one of the color channels, e.g., R, G, or B, of the first image $I_1$ and the second image $I_2$.

When there are multiple update iterations, the overall third loss term can be a sum or a weighted sum of the individual terms for each of the update iterations. For example, the weight of the earlier iterations can be exponentially decayed, e.g., so that the weight for iteration i when there are n total iterations is equal to $\gamma^{n-i}$, where γ is a positive constant less than one, e.g., equal to 0.8.

Figure 4:
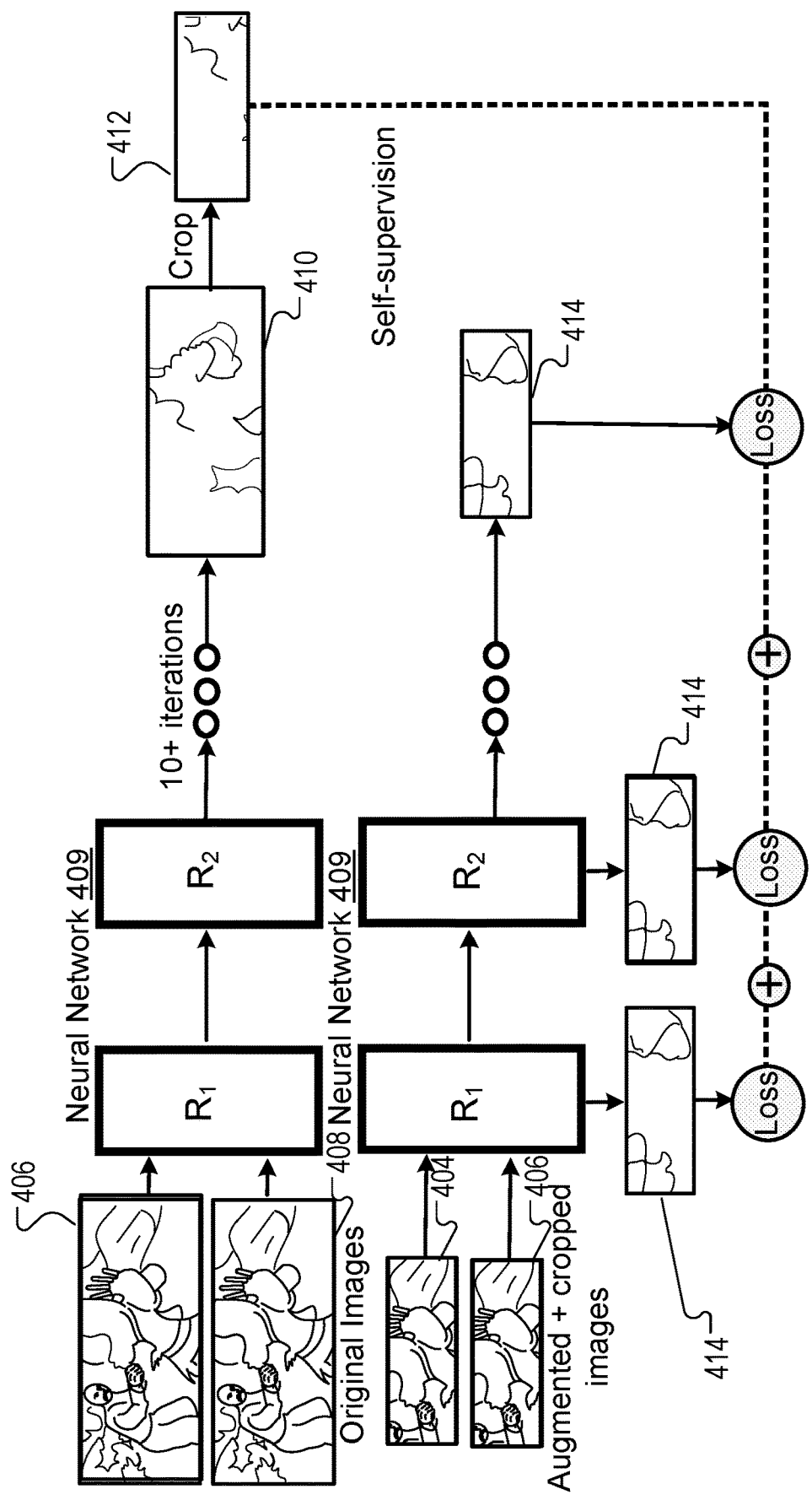
FIG. 4 illustrates an example of the evaluation of a first loss term.

FIG. 4 illustrates an example of the evaluation of the first loss term for a given training image pair.

As can be seen from the example of FIG. 4, the system generates a modified first training image 402 and a modified second training image 404 by cropping and, optionally, also applying one or more augmentations to the original first image 406 and the original second image 408.

The system processes the first training image 406 and the second training image 408, using the neural network 409 to generate a final optical flow estimate 410. As can be seen in FIG. 4, the final optical flow estimate 410 is the final estimate after all of the update iterations have been performed.

The system generates a cropped final optical flow estimate 412 by cropping the final optical flow estimate 410 to include only the predictions for the pixels in the randomly selected region of the first training image.

The system processes the modified first training image 402 and the modified second training image 404 using the neural network 409 to generate a respective modified optical flow estimate 414 for each of the plurality of update iterations.

The system then uses the cropped final optical flow estimate 412 as "self-supervision" to compute the first loss term.

In particular, the first loss term measures, for each training image pair and for each of the plurality of update iterations, an error between (i) the respective modified optical flow estimate for the update iteration for the training image pair and (ii) the cropped final optical flow estimate for the training image pair. Thus, the respective modified optical flow estimate at each iteration is compared to the cropped final optical flow estimate after the final update iteration.

For example, the first loss term for a given iteration can satisfy:

$$\frac{1}{HW}\sum c(\hat{V}_1, V_1),$$

where $$\frac{1}{HW}\sum$$

is the mean over all pixels tor the update iteration of the expression that follows the Σ sign, $\hat{V}_1$ is a target optical flow estimate, $V_1$ is the respective modified optical flow estimate for the update iteration, and c is a function that compares two optical flow estimates. In this case, the target optical flow estimate is the same for all update iterations, i.e., is the cropped final optical flow estimate after the final update iteration. As a particular, example c can be the generalized Charbonnier function, where for two optical flow estimates A and B, $c(A, B)=((A-B)^2+\epsilon^2)^\alpha$ where all operations are performed element-wise, and α and ϵ are fixed constants, e.g., equal to 0.05 and 0.001, respectively.

When there are multiple update iterations, the overall first loss term can be a sum or a weighted sum of the individual terms for each of the update iterations. For example, the weight of the earlier iterations can be exponentially decayed, e.g., so that the weight for iteration i when there are n total iterations is equal to $\gamma^{n-i}$, where γ is a positive constant less than one, e.g., equal to 0.8.

Computing the first loss term in this manner can confer numerous advantages that improve the accuracy of the trained neural network.

As one example, when augmentation is employed, the neural network learns to ignore photometric augmentations because the self-supervised target is computed using a non-augmented version of the corresponding images.

As another example, the neural network learns to make better predictions at the borders and in occluded areas of the image because the self-supervised target is computed using a full-size version of the corresponding images and can incorporate information from outside the boundary of the cropped regions.

As another example, early update iterations of the neural network learn from the output at the final iteration, improving the final quality of the output. This is because the self-supervised target for every iteration is computed from the final estimate generated for the full-sized versions of the corresponding images.

Figure 5:
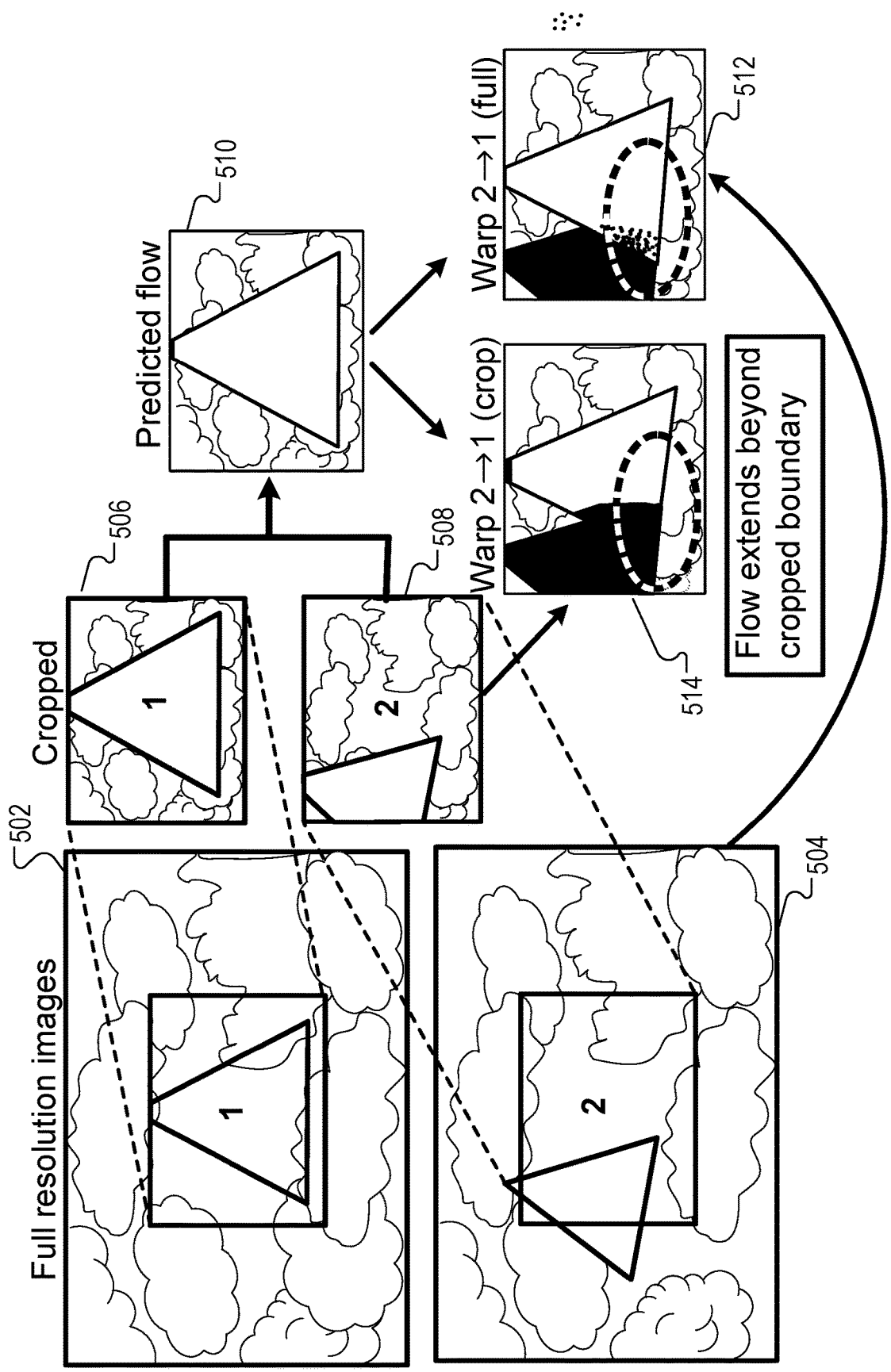
FIG. 5 illustrates an example of the evaluation of a second loss term.

FIG. 5 illustrates an example of the evaluation of the second loss term for a given training image pair at a given update iteration.

Generally, the second loss term measures the photometric consistency between (i) a warped image that is generated by warping a corresponding first image with the optical flow estimate for the first image and (ii) the second image from the same training pair as the first image.

More specifically, as described above, given a first image 502 and a second image 504, the system crops (and optionally augments) each image to generate a modified first image 506 and a modified second image 508.

The system then processes the modified first image 506 and the modified second image 508 using the neural network to generate a respective modified optical flow estimate 510 for each update iteration.

For each update iteration, the system then generates a warped second training image 512 by warping the second training image 504 using the respective modified optical flow estimate 510 for the update iteration. That is, the system warps the second training image 512 rather than warping the modified second image 508 to generate a warped modified second training image 514. To warp the second training image 504 using the modified optical flow estimate 510, the system shifts each pixel in the second training image 504 using the flow prediction for the pixel. For example, if the prediction for the pixel at location x, y in the image is (5, −3), the pixel in the warped output image at location (x+5, y−3) will be the pixel from location (x, y) in the original image.

The second loss term measures, for each training image pair and for each of the plurality of update iterations, a photometric difference between the warped second training image 512 for the training image pair and for the update iteration and the first training image 502 in the training image pair.

In some implementations, the photometric difference is measured using an occlusion mask that masks out occluded pixels from contributing to the photometric difference. The system can compute the occlusion mask from the first image 502 in any of a variety of ways. For example, the system can compute the occlusion mask using range-map based occlusion estimation or using forward backward consistency occlusion estimation.

For example, the second loss term for a given update iteration can satisfy:

$$\frac{1}{HW} \sum O_1 \odot \rho(I_1, w(I_2, V_1)),$$

where $$\frac{1}{HW} \sum$$

is the mean over pixels for the update iteration of the expression that follows the Σ sign, $O_1$ is an occlusion mask in which pixels that are occluded in the first training image $I_1$ are assigned a value of zero and all other pixels are assigned a value of one, $\odot$ represents element-wise multiplication, $w(I_2, V_1)$ is a function that warps the second training image $I_2$ with the optical flow estimate $V_1$, and $\rho$ is a function that measures the photometric difference between two images. For example, $\rho$ can measure the photometric difference between two images based on a soft Hamming distance on the Census-transformed images and can apply the generalized Charbonnier function.

When there are multiple update iterations, the overall second loss term can be a sum or a weighted sum of the individual terms for each of the update iterations. For example, the weight of the earlier iterations can be exponentially decayed, e.g., so that the weight for iteration i when there are n total iterations is equal to $\gamma^{n-i}$, where $\gamma$ is a positive constant less than one, e.g., equal to 0.8.

By using the warped second training image 512 instead of the warped modified second training image 514, the system can ensure better photometric consistency in the predictions generated by the trained neural network for a variety of reasons. For example, compared to warping the cropped image to generate the warped modified second training image 514, full-image warping reduces occlusions from out-of-frame motion (shown in black) and is able to better reconstruct the first image 502. When used during training, full-image warping provides a learning signal for pixels that move outside the cropped image boundary. In other words, techniques that use the warped modified second training image 514 can compute the loss only for pixels that stay inside the cropped image frame because vectors that point outside of the cropped image frame have no pixels to compare their photometric appearance to. Using the warped second training image 512 instead addresses these issues.

As described above, when the first unsupervised loss function includes multiple loss terms, the unsupervised loss function can be equal to a weighted sum of the multiple terms. In some of these implementations, the weights for the loss terms are fixed throughout training.

In some other implementations, the system can modify the weights for the loss terms as training progresses. For example, the system can keep the weights for the second and third terms constant, while increasing the weight of the first loss term at certain points during the training. As a particular example, the system can set the weight for the first loss term to zero for a threshold number of training steps and then linearly increase the weight for the first loss term at training step intervals until it reaches a threshold weight value and then hold the weight constant at the threshold weight value for the remainder of the training steps.

That is, in some implementations, the system pretrains the neural network using only the second and third loss terms before training the neural network on the full first unsupervised loss function.

Figure 6:
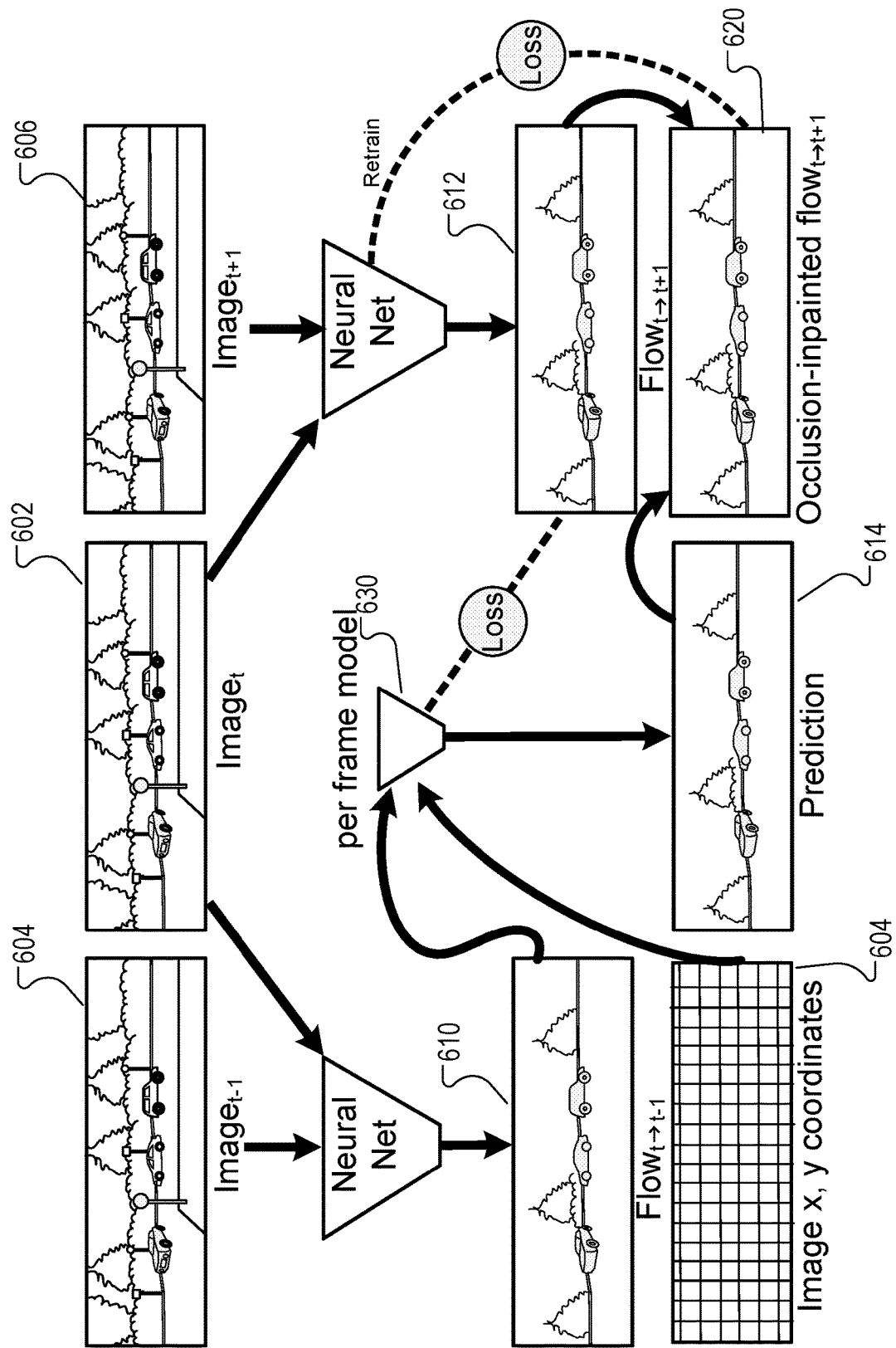
FIG. 6 illustrates an example of the evaluation of a second unsupervised loss function.

FIG. 6 illustrates an example of evaluating the second unsupervised loss for a given second training example.

As seen in FIG. 6, the second training example includes a sequence of three images: (i) a current training image 602 that is taken at time t, (ii) a preceding training image 604 that precedes the current training image in the sequence and is taken at time t−1, and (iii) a following training image 606 that follows the current training image in the sequence and is taken at time t+1.

The system uses these three images to evaluate the second loss function as described below.

The system processes the current training image 602 and the preceding training image 604 in the sequence using the neural network to generate a backward optical flow estimate 610 from the current training image 602 to the preceding training image 604, i.e., so that the prediction for each pixel in the current image 602 represents motion of the pixel from the current training image 602 to the preceding training image 604. The estimate 610 can be the estimate generated by the neural network after the last update iteration.

The system also processes the current training image 602 and the following training image 606 using the neural network to generate a forward optical flow estimate 612 from the current training image 602 to the forward training image 606, i.e., so that the prediction for each pixel in the current training image 602 represents motion of the pixel from the current training image 602 to the following training image 606. The estimate 612 can be the estimate generated by the neural network after the last update iteration.

The system generates, from the backward optical flow estimate 612, a prediction 614 of the forward optical flow estimate 610.

For example, the system can generate the prediction 614 using a learned inversion machine learning model, i.e., a per frame model 630, that takes as input the backward optical flow estimate 612 and, optionally, the image coordinates of each pixel normalized to [−1,1] and generates as output the prediction 614 of the forward optical flow estimate 610.

The learned inversion machine learning model can be a small, computationally efficient neural network, e.g., a convolutional neural network with a small number, e.g., three, of convolutional layers. For example, the inversion neural network can be trained specifically for the preceding image—following image pair. That is, the parameters of the inversion neural network can be re-initialized and trained per second training example using the non-occluded forward flow as supervision. That is, the system can train the inversion model on an objective (e.g., the first loss term described above or a different objective that measures errors between optical flow estimates) that only considers errors in predictions for pixels that are marked as not occluded by an occlusion mask for one of the images in the sequence, e.g., the current image. The occlusion mask can be generated using one of the techniques described above with reference to FIG. 5. Errors for pixels that are marked as occluded in the occlusion mask are disregarded when evaluating the objective. However, training the model on this objective nonetheless results in improved predictions for occluded pixels due to the supervision from the non-occluded pixels.

The system generates an in-painted forward flow estimate 620 from the prediction 614 and from the forward optical flow estimate 610. That is, the system in-paints one or more occluded regions of the forward optical flow estimate using the prediction. In particular, for each pixel that is marked as occluded by the occlusion mask, the system can use, as the prediction for the pixel in the in-painted estimate 620, the prediction for the pixel from the prediction 614. For each pixel that is not marked as occluded by the occlusion mask, the system can use the prediction for the pixel from the forward estimate 610.

The system then uses the in-painted forward flow estimate 620 to evaluate the second loss function.

In some implementations, the system generates the in-painted forward flow estimates 620 for all of the second training examples before performing any training of the neural network using the second loss function. That is, the system pre-computes the in-painted forward flow estimates using the neural network with parameter values equal to those that were determined by training on the first loss function. When training on a given batch of second training examples, the system then generates a new forward optical flow estimate 610 using the current values of the network parameters as of the training step and evaluates the loss function using the pre-computed in-painted estimate 620 and the new forward optical flow estimate 610. In some implementations, the system generates the new forward optical flow estimate 610 using modified versions of the corresponding images as described above with reference to FIGS. 3 and 4.

In some other implementations, at each training step, the system computes both the estimate 620 and the estimate 610 in accordance with the current values of the network parameters as of the training step. In some implementations, the system generates one forward optical flow estimate 610 using modified versions of the corresponding images as described above with reference to FIGS. 3 and 4 (to be used as the predicted flow to be evaluated by the loss function) and another forward optical flow estimate 610 using the original versions of the corresponding images (to be used to compute the in-painted estimate 620).

In particular, the second loss function includes a fourth loss term that measures, for each second training example, an error between the in-painted forward flow estimate and the forward optical flow estimate. In some implementations, the system only evaluates the fourth loss term for the final forward optical flow estimate, i.e., the optical flow estimate after the final update iteration. In some other implementations, the system evaluates the fourth less term for each update iteration. In these implementations, the overall second loss term can be a sum or a weighted sum of the individual terms for each of the update iterations. For example, the weight of the earlier iterations can be exponentially decayed, e.g., so that the weight for iteration i when there are n total iterations is equal to $\gamma^{n-i}$, where $\gamma$ is a positive constant less than one, e.g., equal to 0.8.

For example, the fourth term can be the same as the first term described above, but with the in-painted estimate 620 as the target and the forward optical flow estimate 610 as the prediction.

By using the in-painted estimate 610 as the target, the system can generate better, more accurate targets in occluded areas, resulting in improved performance of the trained neural network in occluded areas after training.

As described above, the system computes a gradient of this second loss function for each training example in the batch and then updates the network parameters using the gradient.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers and for training a neural network that has a plurality of network parameters and that is configured to receive as input a first image and a second image and to generate as output an optical flow estimate of optical flow between the first image and the second image, the method comprising:
   obtaining a batch of one or more training image pairs, each training image pair comprising a respective first training image and a respective second training image;
   for each of the one or more training image pairs:
      processing the first training image and the second training image using the neural network to generate a final optical flow estimate from the first training image to the second training image;
      generating a cropped final optical flow estimate from the first training image to the second training image, comprising cropping the final optical flow estimate from the first training image to the second training image; and
   training the neural network on the one or more training image pairs, the training comprising, for each training image pair, using the cropped final optical flow estimate for the training image pair as a target output for the neural network.

2. The method of claim 1, further comprising, for each of the one or more training image pairs:
   generating a modified first training image, comprising cropping the first training image in the training image pair;
   generating a modified second training image, comprising cropping the second training image in the training image pair; and
   processing the modified first training image and the modified second training image using the neural network to generate one or more modified optical flow estimates, wherein training the neural network on the one or more training image pairs comprises:
   computing a gradient with respect to the network parameters of a loss function that comprises a first term that measures, for each training image pair, an error between (i) the one or more modified optical flow estimates for the training image pair and (ii) the cropped final optical flow estimate for the training image pair; and
   updating the network parameters using the gradient.

3. The method of claim 2, wherein the neural network is configured to generate the optical flow estimate of optical flow between the first image and the second image by:
   initializing the optical flow estimate, and
   at each of a plurality of update iterations, updating the optical flow estimate using features of the first image and the second image, and
   wherein the one or more modified optical flow estimates include a respective modified optical flow estimate for each of the update iterations.

4. The method of claim 3, wherein the first term measures, for each training image pair and for each of the plurality of update iterations, an error between (i) the respective modified optical flow estimate for the update iteration for the training image pair and (ii) the cropped final optical flow estimate for the training image pair.

5. The method of claim 3, further comprising, for each training image pair and for each of the plurality of update iterations:
   generating a warped second training image by warping the second training image in the training image pair using the respective modified optical flow estimate for the update iteration, wherein:
   the loss function further comprises a second term that measures, for each training image pair and for each of the plurality of update iterations, a photometric difference between the warped second training image for the training image pair and for the update iteration and the first training image in the training image pair.

6. The method of claim 5, wherein the photometric difference is measured using an occlusion mask that masks out occluded pixels from contributing to the photometric difference.

7. The method of claim 3, wherein the loss function comprises a third term that measures, for each training image pair and for each of the plurality of update iterations, an edge-aware smoothness of the respective modified optical flow estimate for the training image pair and for the update iteration.

8. The method of claim 1, further comprising:
   obtaining one or more sequences of training images, each sequence comprising (i) a current training image, (ii) a preceding training image that precedes the current training image in the sequence, and (iii) a following training image that follows the current training image in the sequence;
   for each sequence:
      processing the current training image and the preceding training image in the sequence using the neural network to generate a backward optical flow estimate from the current training image to the preceding training image;

processing the current training image and the following training image in the sequence using the neural network to generate a forward optical flow estimate from the current training image to the forward training image;

generating, from the backward optical flow estimate, a prediction of the forward optical flow estimate; and generating an in-painted forward flow estimate from the prediction and from the forward optical flow estimate;

computing a gradient with respect to the network parameters of a second loss function that includes a third term that measures, for each sequence, an error between the in-painted forward flow estimate and the forward optical flow estimate; and updating the network parameters using the gradient.

9. The method of claim 8, wherein generating, from the backward optical flow estimate, a prediction of the forward optical flow estimate comprises:

processing an input comprising at least the backward optical flow estimate using a learned inversion machine learning model that has been trained to generate the prediction.

10. The method of claim 9, wherein the input comprises normalized image coordinates of the pixels in the current image.

11. The method of claim 9, wherein the learned inversion machine learning model is trained specifically for the preceding image—following image pair.

12. The method of claim 8, wherein generating an in-painted forward flow estimate from the prediction and from the forward optical flow estimate comprises:

in-painting one or more occluded regions of the forward optical flow estimate using the prediction.

13. The method of claim 1, wherein the optical flow estimate of optical flow between the first image and the second image includes, for each pixel in the first image, a respective offset of a corresponding pixel in the second image.

14. The method of claim 1, wherein:

generating a modified first training image further comprises applying one or more data augmentations to the first training image in the pair; and generating a modified second training image further comprises applying one or more data augmentations to the second training image in the pair.

15. One or more non-transitory computer-readable storage media storing instructions that when executed by one or more computers cause the one or more computers to perform operations for training a neural network that has a plurality of network parameters and that is configured to receive as input a first image and a second image and to generate as output an optical flow estimate of optical flow between the first image and the second image, the operations comprising:

obtaining a batch of one or more training image pairs, each training image pair comprising a respective first training image and a respective second training image;

for each of the one or more training image pairs:

processing the first training image and the second training image using the neural network to generate a final optical flow estimate from the first training image to the second training image;

generating a cropped final optical flow estimate from the first training image to the second training image, comprising cropping the final optical flow estimate from the first training image to the second training image; and training the neural network on the one or more training image pairs, the training comprising, for each training image pair, using the cropped final optical flow estimate for the training image pair as a target output for the neural network.

16. A system comprising:

one or more computers; and one or more storage devices storing instructions that, when executed by the one or more computers, cause the one or more computers to perform operations training a neural network that has a plurality of network parameters and that is configured to receive as input a first image and a second image and to generate as output an optical flow estimate of optical flow between the first image and the second image, the operations comprising:

obtaining a batch of one or more training image pairs, each training image pair comprising a respective first training image and a respective second training image;

for each of the one or more training image pairs:

processing the first training image and the second training image using the neural network to generate a final optical flow estimate from the first training image to the second training image;

generating a cropped final optical flow estimate from the first training image to the second training image, comprising cropping the final optical flow estimate from the first training image to the second training image; and training the neural network on the one or more training image pairs, the training comprising, for each training image pair, using the cropped final optical flow estimate for the training image pair as a target output for the neural network.

17. The system of claim 16, the operations further comprising, for each of the one or more training image pairs:

generating a modified first training image, comprising cropping the first training image in the training image pair;

generating a modified second training image, comprising cropping the second training image in the training image pair; and processing the modified first training image and the modified second training image using the neural network to generate one or more modified optical flow estimates, wherein training the neural network on the one or more training image pairs comprises:

computing a gradient with respect to the network parameters of a loss function that comprises a first term that measures, for each training image pair, an error between (i) the one or more modified optical flow estimates for the training image pair and (ii) the cropped final optical flow estimate for the training image pair; and updating the network parameters using the gradient.

18. The system of claim 17, wherein the neural network is configured to generate the optical flow estimate of optical flow between the first image and the second image by:

initializing the optical flow estimate, and at each of a plurality of update iterations, updating the optical flow estimate using features of the first image and the second image, and wherein the one or more modified optical flow estimates include a respective modified optical flow estimate for each of the update iterations.

19. The system of claim 18, wherein the first term measures, for each training image pair and for each of the plurality of update iterations, an error between (i) the respective modified optical flow estimate for the update iteration for the training image pair and (ii) the cropped final optical flow estimate for the training image pair.

20. The system of claim 18, further comprising, for each training image pair and for each of the plurality of update iterations:
   generating a warped second training image by warping the second training image in the training image pair using the respective modified optical flow estimate for the update iteration, wherein:
   the loss function further comprises a second term that measures, for each training image pair and for each of the plurality of update iterations, a photometric difference between the warped second training image for the training image pair and for the update iteration and the first training image in the training image pair.

* * * * *